US012639063B1

(12) United States Patent　(10) Patent No.:　US 12,639,063 B1
Kumar et al.　(45) Date of Patent:　May 26, 2026

(54) ARTIFICIAL INTELLIGENCE FRAMEWORK FOR TRANSFORMING CLOUD COMPUTING

(71) Applicant: EQUIFAX INC., Atlanta, GA (US)

(72) Inventors: Sukesh Kumar, Suwanee, GA (US); Ankit Agrawal, Cumming, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

(21) Appl. No.: 19/371,192

(22) Filed: Oct. 28, 2025

(51) Int. Cl.
　*G06F 8/658* (2018.01)
　*G06F 8/70* (2018.01)
　*G06F 11/07* (2006.01)
　*G06F 11/30* (2006.01)
　*G06F 11/3604* (2025.01)

(52) U.S. Cl.
　CPC .............. *G06F 8/658* (2018.02); *G06F 8/70* (2013.01); *G06F 11/0793* (2013.01); *G06F 11/302* (2013.01); *G06F 11/3616* (2013.01)

(58) Field of Classification Search
　CPC ........ G06F 8/658; G06F 8/70; G06F 11/0793; G06F 11/302; G06F 11/3616; G06F 8/65; G06F 8/71
　See application file for complete search history.

(56) References Cited

U.S. PATENT DOCUMENTS

2020/0293310 A1 * 9/2020 Mittell ...................... G06F 8/76

FOREIGN PATENT DOCUMENTS

CN　109857431 A * 6/2019 .............. G06F 11/36
CN　111240719 A * 6/2020 .............. G06F 8/71

OTHER PUBLICATIONS

Yue Jiang; Comparing Design and Code Metrics for Software Quality Prediction; ACM; pp. 11-18; retrieved on Jan. 6, 2025 (Year: 2008).*
Vincenzo Ferme; Automatic metric thresholds derivation for code smell detection; IEEE; pp. 44-53; retrieved on Jan. 6, 2025 (Year: 2015).*

* cited by examiner

Primary Examiner — S. Sough
Assistant Examiner — Cuong V Luu
(74) Attorney, Agent, or Firm — Kilpatrick Townsend & Stockton LLP

(57) ABSTRACT

A system can receive data that includes a first subset and a second subset relating to a first application and a second application in a cloud computing environment. The system can determine differences between the first subset and the second subset by comparing the first subset and the second subset. The system can generate, by using the differences, quality metrics for a transformation from the first application to the second application in the cloud computing environment. The system can generate, by using historical data that includes historical first subsets and second subsets, a trend that represents a progression of the transformation. The system can determine, by using the differences, the quality metrics, and the trend, code in the second application that is likely to cause the differences. The system can generate a command that is executable in the cloud computing environment to automatically update the code in the second application.

20 Claims, 4 Drawing Sheets

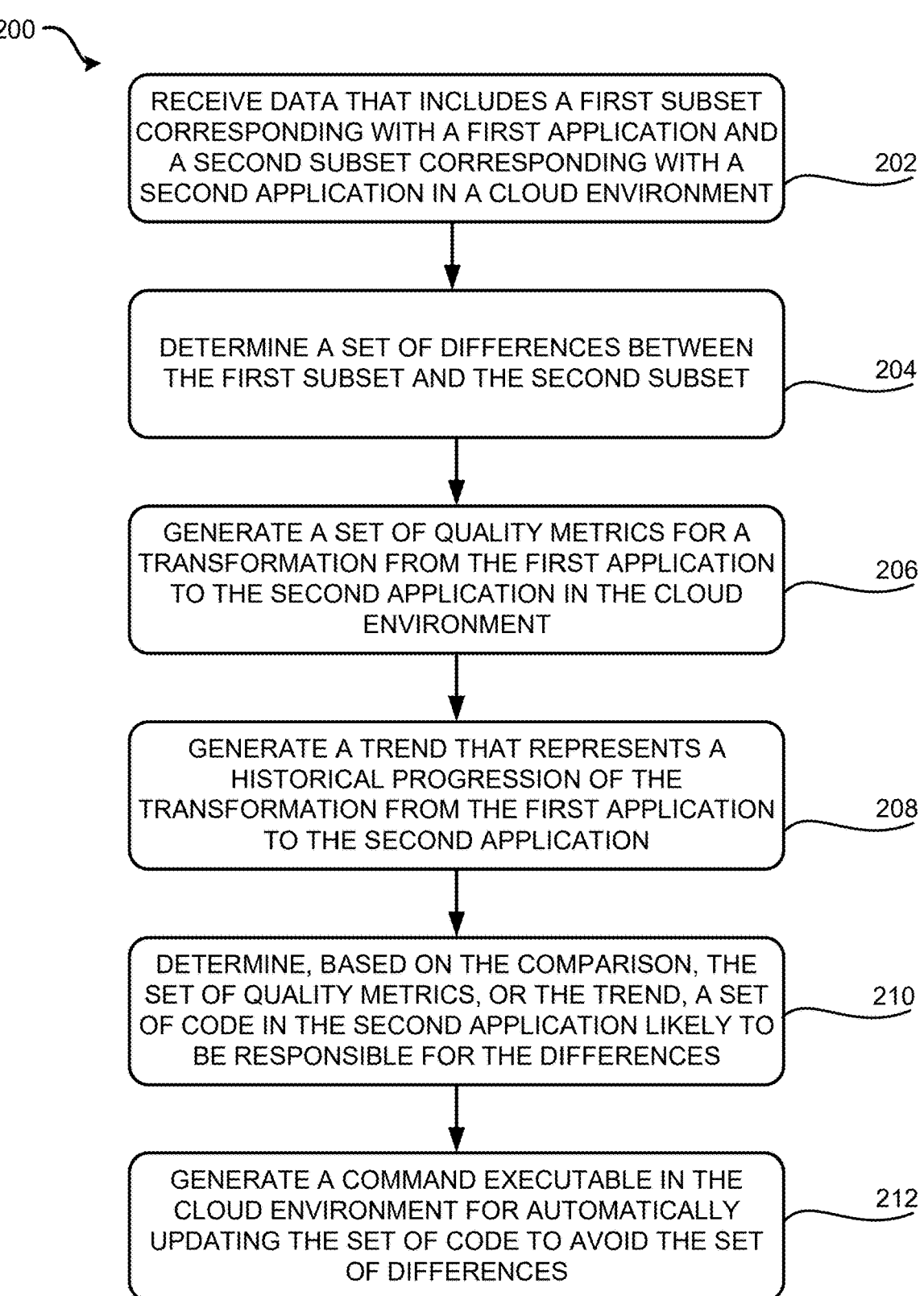

200

RECEIVE DATA THAT INCLUDES A FIRST SUBSET CORRESPONDING WITH A FIRST APPLICATION AND A SECOND SUBSET CORRESPONDING WITH A SECOND APPLICATION IN A CLOUD ENVIRONMENT — 202

DETERMINE A SET OF DIFFERENCES BETWEEN THE FIRST SUBSET AND THE SECOND SUBSET — 204

GENERATE A SET OF QUALITY METRICS FOR A TRANSFORMATION FROM THE FIRST APPLICATION TO THE SECOND APPLICATION IN THE CLOUD ENVIRONMENT — 206

GENERATE A TREND THAT REPRESENTS A HISTORICAL PROGRESSION OF THE TRANSFORMATION FROM THE FIRST APPLICATION TO THE SECOND APPLICATION — 208

DETERMINE, BASED ON THE COMPARISON, THE SET OF QUALITY METRICS, OR THE TREND, A SET OF CODE IN THE SECOND APPLICATION LIKELY TO BE RESPONSIBLE FOR THE DIFFERENCES — 210

GENERATE A COMMAND EXECUTABLE IN THE CLOUD ENVIRONMENT FOR AUTOMATICALLY UPDATING THE SET OF CODE TO AVOID THE SET OF DIFFERENCES — 212

FIG. 2

ARTIFICIAL INTELLIGENCE FRAMEWORK FOR TRANSFORMING CLOUD COMPUTING

TECHNICAL FIELD

The present disclosure relates generally to computing operations and cloud computing. More specifically, but not by way of limitation, this disclosure relates to an artificial intelligence framework that can be used to facilitate transformation of applications or programs in a cloud computing environment.

BACKGROUND

Cloud computing systems can be configured to host or otherwise facilitate operation of various applications or other processes. For example, an application can be developed to process data in a cloud computing system based on defined inputs. Over time, the application may change, input data may change, and the like. For example, a new version of the application may be developed, or a new application may be developed to replace the original application. The original application may process and generate massive amounts of data in a particular, defined way. Replacing the original application with a new version of the application or a newly developed application may introduce technical issues in the cloud computing environment. For example, replacing the original application with a new version of the application or a newly developed application may introduce errors in data handling, may produce outputs that are incorrect or that lack a threshold security, etc.

SUMMARY

Various aspects of the present disclosure provide systems and methods for an artificial intelligence framework that can be used for transforming cloud computing applications. A system can include a processor and a non-transitory computer-readable medium that can include instructions that are executable by the processor to cause the processor to perform various operations. The system can receive data that includes a first subset and a second subset. The first subset can include data relating to a first application in a cloud computing environment, and the second subset can include data relating to a second application in the cloud computing environment. The system can determine a set of differences between the first subset and the second subset by comparing the first subset and the second subset. The system can generate, by using the set of differences as input, a set of quality metrics for a transformation from the first application to the second application in the cloud computing environment. The system can generate, by using a set of historical data that includes a set of historical first subsets and a set of second subsets, a trend that represents a progression of the transformation from the first application to the second application in the cloud computing environment. The system can determine, by using the set of differences, the set of quality metrics, and the trend, a set of code in the second application that is likely to cause the set of differences. The system can generate a command that is executable in the cloud computing environment. The command may be executed to automatically update the set of code in the second application to a second set of code in the second application that does not cause the set of differences.

In other aspects, a method can be used to facilitate operation of an artificial intelligence framework that can be used for transforming cloud computing applications. The method can include receiving data that includes a first subset and a second subset. The first subset can include data relating to a first application in a cloud computing environment, and the second subset can include data relating to a second application in the cloud computing environment. The method can include determining a set of differences between the first subset and the second subset by comparing the first subset and the second subset. The method can include generating, by using the set of differences as input, a set of quality metrics for a transformation from the first application to the second application in the cloud computing environment. The method can include generating, by using a set of historical data that includes a set of historical first subsets and a set of second subsets, a trend that represents a progression of the transformation from the first application to the second application in the cloud computing environment. The method can include determining, by using the set of differences, the set of quality metrics, and the trend, a set of code in the second application that is likely to cause the set of differences. The method can include generating a command that is executable in the cloud computing environment. The command can be executed to automatically update the set of code in the second application to a second set of code in the second application that does not cause the set of differences.

In other aspects, a non-transitory computer-readable medium can include instructions that are executable by a processing device for causing the processing device to perform various operations. The operations can include receiving data that includes a first subset and a second subset. The first subset can include data relating to a first application in a cloud computing environment, and the second subset can include data relating to a second application in the cloud computing environment. The operations can include determining a set of differences between the first subset and the second subset by comparing the first subset and the second subset. The operations can include generating, by using the set of differences as input, a set of quality metrics for a transformation from the first application to the second application in the cloud computing environment. The operations can include generating, by using a set of historical data that includes a set of historical first subsets and a set of second subsets, a trend that represents a progression of the transformation from the first application to the second application in the cloud computing environment. The operations can include determining, by using the set of differences, the set of quality metrics, and the trend, a set of code in the second application that is likely to cause the set of differences. The operations can include generating a command that is executable in the cloud computing environment. The command can be executed to automatically update the set of code in the second application to a second set of code in the second application that does not cause the set of differences.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF DRAWINGS

FIG. 2 is a flowchart illustrating an example of a process for facilitating operation of an artificial intelligence framework that can be used for transforming cloud computing applications according to certain aspects of the present disclosure.

DETAILED DESCRIPTION

Figure 1:
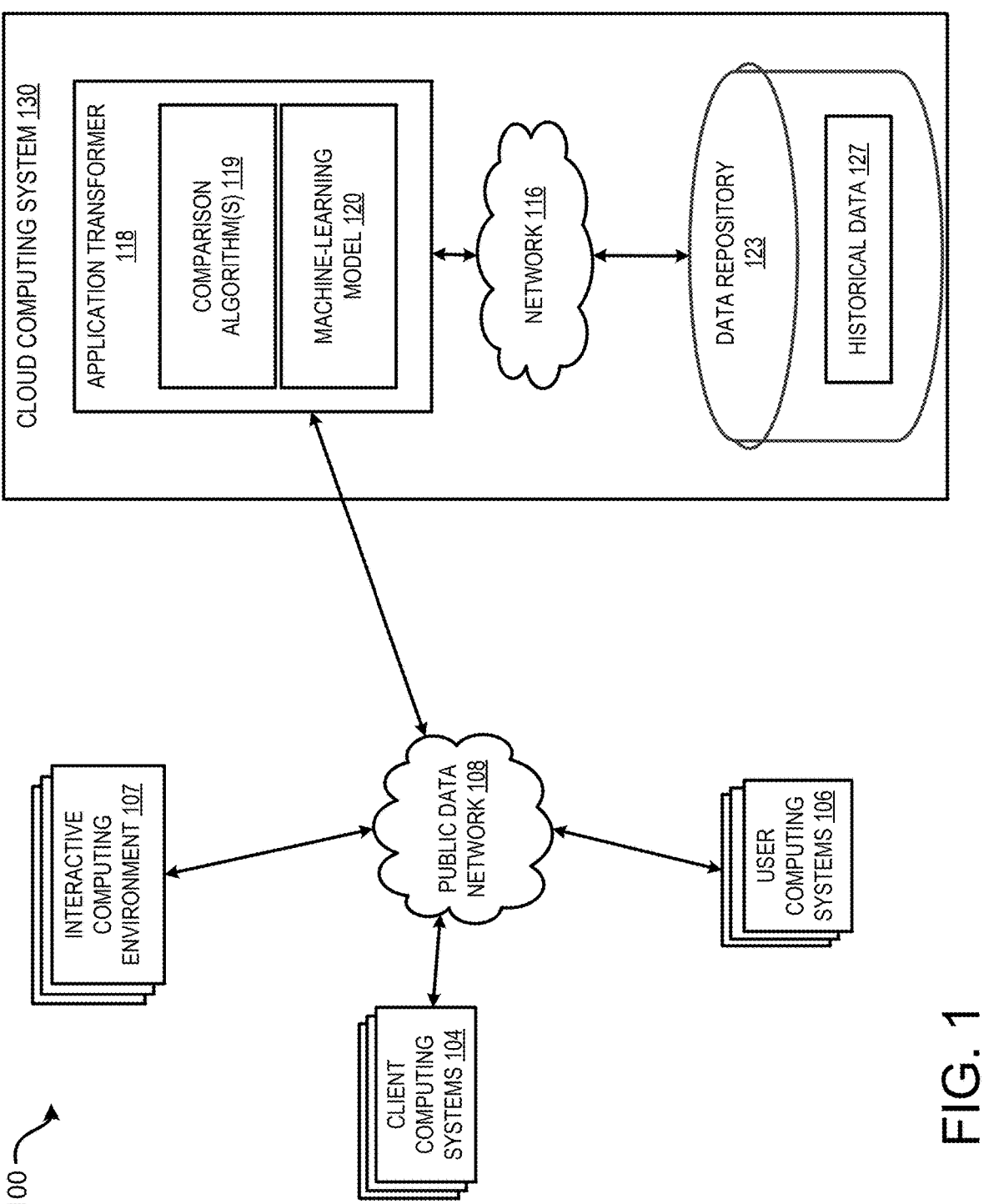
FIG. 1 is a block diagram illustrating an example of a computing environment in which an artificial intelligence framework can be used to transform cloud computing applications according to certain aspects of the present disclosure.

Certain aspects described herein relate to an artificial intelligence framework that can be used for transforming cloud computing applications. The artificial intelligence framework can include various artificial intelligence components, various algorithmic components, and the like to facilitate operations such as those relating to transforming cloud computing applications. A cloud computing application can include an application, such as a software module or other suitable application, that can receive input in a cloud computing system and that can generate output in the cloud computing system. The cloud computing application may be communicatively coupled with a remote computing system to which the cloud computing application can transmit the output. Transforming a cloud computing application can involve updating an existing application in a cloud computing environment to a new version of the application, to a replacement application in the cloud computing environment, etc. For example, the new version of the application, or the replacement application, may be designed to receive similar inputs, to generate similar outputs, or a combination thereof, but an underlying function or design of the new version of the application, or the replacement application, may be different from the original application.

Transforming applications in cloud computing environments can be difficult. For example, while the new version of the application, or the replacement application, may be designed to receive similar inputs and generate similar outputs as the original application, implementing the new version of the application, or the replacement application, may be difficult to do without encountering errors. As an example, the new version of the application, or the replacement application, may be configured to receive or generate data in a different format from the data associated with the original application. Additionally, or alternatively, data handling paths within the new version of the application, or the replacement application, may be different from the original application, and the new version of the application, or the replacement application, may generate unexpected output that may not be correct or suitable for providing to a using entity.

Certain aspects described herein, which can include an artificial intelligence framework that can be used for transforming cloud computing applications, can improve at least the technical fields of cloud computing, artificial intelligence, or a combination thereof. For example, the technical field of cloud computing can be improved using the artificial intelligence framework by providing more accurate outputs with less latency. By using the artificial intelligence framework, which can use artificial intelligence techniques to correct new versions or replacement applications, the applications in the cloud computing environment generate outputs that are more accurate than other applications and that have less latency than other applications. Additionally, or alternatively, the technical field of artificial intelligence can be improved using the artificial intelligence framework by providing a new architecture that allows artificial intelligence models to learn more accurately than other architectures. By using the artificial intelligence framework, the artificial intelligence models in the framework can receive more inputs, and more accurate and insightful inputs, than in other frameworks, which leads to better learning outcomes than other artificial intelligence models in the other frameworks.

In cloud computing and analysis environments, entities may compare large sets of structured and unstructured data. Other comparison techniques rely on manual intervention, disparate tools, and inefficient workflows, leading to inconsistencies, scalability issues, and delays in decision making. For example, the other comparison techniques, or other systems that use the other comparison techniques, lack the ability to transform applications in cloud computing environments. In particular, the other systems lack a unified approach that integrates multiple stages of comparison or transformation, including data ingestion, transformation, and validation. The other systems also fail to efficiently manage complex pipelines in which multiple components interact in a structured flow. The other systems do not provide an automated, modular framework, such as the artificial intelligence framework, that allows independent component execution while maintaining an end-to-end transformation process.

In some examples, a transformation from a first application to a second application can involve running the first application and the second application in parallel while comparisons or other suitable analyses are conducted on the first application and the second application. For example, if a transformation is being performed in a cloud computing environment from the first application to the second application, which can be or include a new version of the first application or a new application for replacing the first application, then the second application may be loaded into, or otherwise provided to, the cloud computing environment and run at least partially in parallel with the first application. For a predetermined time, or until a performance of the second application exceeds a predetermined threshold performance level, the first application and the second application may run at least partially in parallel to allow effective analyses between the first application and the second application, or data generated thereby.

The artificial intelligence framework disclosed herein, or system that includes the framework, can be or include a highly configurable and customizable transformation tool suite that can address the above-described technical problems or other inefficiencies. For example, the system can provide a structured, modular pipeline for automated transformation of applications in a cloud computing environment. In some examples, the system may provide automated comparison, automated transformation, or a combination thereof for data handled by the application in the cloud computing environment. The system can reduce or eliminate manual interventions, can improve accuracy, can enable scalable and flexible integration of new applications, or data associated therewith, in the cloud computing environment, and the like.

The system can integrate multiple components into a unified data or application transformation pipeline. The multiple components can include one or more algorithmic components, one or more artificial intelligence components, other suitable components or modules, or any combination thereof. The system can include key components or modules that can each be responsible for a specific phase in the comparison or transformation process to ensure streamlined, stable, and automated execution of operations by the system for transforming applications or data thereof in the cloud computing environment. In some examples, the system may be highly configurable and may be customized based on needs of using entities. In particular, any component or module of the system can allow for customized algorithms, artificial intelligence, and the like.

The system can include various components or modules to facilitate the transformation of the application or data thereof. As an example, the various components or modules can include a comparison module, a quality module, a trend module, a blame module, other suitable modules for providing functionality for the system, or any combination thereof. The comparison module can serve as an initial stage of the pipeline provided by the system. The comparison module may be responsible for collecting data, transforming data, processing data, or any combination thereof from multiple sources to provide comparison results at a record level. In some examples, an output of the comparison module can include a report of a total number of differences, and what the differences are or where they are located in code or output, between a first application, such as an original application, and a second application, such as a new version of the original application or a replacement application, or the data thereof.

The quality module can use field sensors, file sensors, or a combination thereof to detect changes, to validate input data, to prepare data for a deeper field level comparison, or any combination thereof. In some examples, an output of the quality module can include one or more quality metrics based on the comparison report from the comparison module. For example, the quality metrics can include how far apart, or how different, the first application and the second application, or the data thereof, are from each other. Additionally, or alternatively, the quality metrics can be customized to allow an entity to provide custom logic or artificial intelligence for performing a deep comparison of the differences identified in the comparison report. An output of the quality module can include a quality report that can identify or otherwise describe quality metrics based on the differences identified between the first application and the second application, or the data thereof.

The trend module can aggregate results, generate insights, visualize key comparison metrics, or any combination thereof. The trend module may receive historical comparison reports, historical quality reports, and the like from historical instances of executing the comparison module and the quality module on historical data. In some examples, the comparison module and the quality module may operate, or may otherwise be executed on, a single dataset or single pair of datasets at a time, while the trend module can be executed on multiple datasets. In a particular example, the comparison module and the quality module can be executed on a first dataset pair on a first day (e.g., data from the first application and the second application on the first day) and a second dataset pair on a second day (e.g., data from the first application and the second application on the second day) to generate a first comparison report, a first quality report, a second comparison report, and a second quality report. In such examples, the trend module can be executed on the first comparison report, the first quality report, the second comparison report, and the second quality report to generate a trend report. In some examples, the trend report can describe whether the transformation from the first application to the second application is trending toward more accurate output and less latent processing. Some examples of types of data included in the trend report can include one or more plots for visualizing the trend, a report of particular data or data types that are trending in different directions, and the like.

The blame module can be or include a final processing stage that can ensure consistency and integrity of an overall output generated by the system. In some examples, the blame module can be or include an artificial intelligence model that can receive input from one or more of the comparison module, the quality module, or the trend module and that can generate output that can indicate what code or processing in the second application has caused, or is causing, differences in data between the first application and the second application. That is, the blame module can identify, in the second application, particular code that is to blame for causing differences or other issues between the first application and the second application. In some examples, the blame module may automatically generate code changes for fixing or otherwise adjusting the code of the second application to no longer generate the differences identified in the comparison report.

In some examples, the system can be used instead of multiple disparate tools or modules. The system can integrate the above-described components or modules into a single, seamless pipeline that can be customized. Each module of the system can function or otherwise be invoked independently from one another as part of the single, seamless pipeline to provide flexibility in deployment. The system can automate transformation of applications, or data thereof, in a cloud computing environment. Additionally, or alternatively, the system can automate application, or data, validation, can automate application, or data, reporting, and the like in a cloud computing environment. The system can be scalable and efficient. For example, the system, such as via the components or modules thereof, can be designed to handle large-scale datasets efficiently and can be designed to be adaptable for various different types of using entities. In some examples, the system can reduce or eliminate reliance on manual intervention in transforming applications in cloud computing, can reduce or eliminate errors in transforming applications in cloud computing, can improve efficiency and resource-use efficiency, etc.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Application Transformation in a Cloud Environment Referring now to the drawings, FIG. 1 is a block diagram illustrating an example of a computing environment 100, such as a cloud computing environment, in which an artificial intelligence framework can be used to transform cloud computing applications according to certain aspects of the present disclosure. FIG. 1 illustrates examples of hardware components of a cloud computing system 130 according to some aspects. The cloud computing system 130 can be a specialized computing system that may be used for processing large amounts of data, such as for automatically generating or configuring infrastructure, controlling access to the infrastructure, generating outputs based on defined inputs, and so on, using a large number of computer processing cycles. The cloud computing system 130 can include an application transformer 118 for facilitating transformation, such as using artificial intelligence, of applications, or data thereof, in a cloud computing environment. In some examples, the cloud computing system 130 can include other suitable components, servers, subsystems, and the like.

The application transformer 118 can include one or more processing devices that can execute program code, such as comparison algorithm(s) 119, a machine-learning model 120, other suitable program code, or any combination thereof. The program code can be stored on a non-transitory computer-readable medium or other suitable medium. The application transformer 118 can perform application transformation operations, data transformation operations, or access control operations for validating or otherwise authenticating, for example using other suitable modules, services, models, components, etc. of the application transformer 118, an access request of user computing systems 106 for accessing an interactive computing environment 107 that includes or is otherwise associated with an application.

In some examples, the comparison algorithm(s) 119 can include one or more algorithms, modules, or services that can provide supporting processing for transforming a first application, or data thereof, to a second application, or data thereof, in the cloud computing environment. In a particular example, the comparison algorithm(s) 119 can include a comparison algorithm, a quality algorithm, and a trend algorithm that can each perform unique or specified operations for facilitating transformation of the first application to the second application. The comparison algorithm(s) 119 can compare data from the first application and the second application, can generate quality metrics based on differences between the first application and the second application, can generate a trend describing a historical adherence to the transformation from the first application to the second application, can perform other suitable operations, or any combination thereof. In some examples, the trend can include a visual representation of a progression of the transformation. The visual representation can include a graph, a plot, or other visual representation that can be presented on a user interface such as a user interface of the user computing systems 106. In some examples, the trend can illustrate, at each point in time corresponding to each historical comparison performed, a first point corresponding with perfect adherence to the transformation and a second point corresponding with an actual adherence to the transformation. Perfect adherence may indicate that the first application and the second application, or the datasets thereof, are indistinguishable.

The machine-learning model 120 can be or include any suitable machine-learning model such as a convolutional neural network, a neural network powered by reinforcement learning, a recurrent neural network, etc. In some examples, the machine-learning model 120 may be trained to make predictions about code of the first application, the second application, or a combination thereof. For example, the machine-learning model 120 can include or power a blame module that can assign blame to code or can otherwise identify code that may cause differences or errors in output generated by the first application, the second application, or a combination thereof.

In some examples, the comparison algorithm(s) 119, the machine-learning model 120, or a combination thereof can use data, such as historical data 127, to guide processing or inform on decision-making. The historical data 127 may be manually provided to a data repository 123. In other examples, the historical data 127 may be automatically stored or updated in the data repository 123 in response to (i) historical comparisons by the comparison algorithm(s) 119, (ii) historical predictions by the machine-learning model 120, or a combination thereof. In examples in which the comparison algorithm(s) 119 or the machine-learning model 120 is or includes an artificial intelligence model or other implementations of artificial intelligence, a training dataset can be stored in the data repository 123. In some examples, the training dataset can be used to train the artificial intelligence model, one or more machine-learning models, which may include a supervised machine-learning model, an unsupervised machine-learning model, a generative artificial intelligence model, and the like, included therein, etc. The artificial intelligence model, or other implementations of artificial intelligence, can be trained to generate summaries of comparisons, predict quality metrics, generate trend summaries, predict causes of differences or errors, etc.

Network-attached storage units may store a variety of different types of data organized in a variety of different ways and from a variety of different sources. For example, the network-attached storage unit may include storage other than primary storage located within the application transformer 118 that is directly accessible by processors located therein. In some aspects, the network-attached storage unit may include secondary, tertiary, or auxiliary storage, such as large hard drives, servers, and virtual memory, among other types of suitable storage. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory devices, or other suitable media.

Furthermore, the cloud computing system 130 can communicate with various other computing systems. The other computing systems can include user computing systems 106, such as smartphones, personal computers, etc., client computing systems 104, and other suitable computing systems. For example, user computing systems 106 may transmit, such as in response to receiving input from the receiving entity, requests for accessing the interactive computing environment 107, requests for generating or configuring infrastructure (e.g., within the interactive computing environment 107), or other suitable requests to the client computing systems 104. The client computing systems 104 can send the requests to the cloud computing system 130, and the cloud computing system 130 may process the requests such as via the application transformer 118, the comparison algorithm(s) 119, the machine-learning model 120, etc. In some examples, the requests may be transmitted directly from the user computing systems 106 to the cloud computing system 130. While FIG. 1 illustrates that the cloud computing system 130 and the client computing systems 104 are separate systems, the cloud computing system 130 and the client computing systems 104 can be one system. For example, the cloud computing system 130 can be a part of the client computing systems 104, or vice versa.

As illustrated in FIG. 1, the cloud computing system 130 may interact with the client computing systems 104, the user computing systems 106, or a combination thereof via one or more public data networks 108 to facilitate interactions between users of the user computing systems 106 and the interactive computing environment 107, which may be or include a cloud computing environment or system. For example, the cloud computing system 130 can facilitate the client computing systems 104 providing a user interface to the user computing system 106 for receiving various data, such as data that can be used to generate or cause generation or configuration of computing resources in the interactive computing environment 107, to generate output using a first application or a second application, etc. The cloud computing system 130 can transmit information generated from the application transformer 118 to the client computing systems 104 for facilitating transformation of a first application to a second application. In some examples, the cloud computing system 130 can additionally communicate with third-party systems, such as external data systems, to receive risk assessment data, entity data, interaction data, evidence data, and other data relating to the user or the request for computing resources through the public data network 108. In some examples, the third-party systems can provide real-time data, such as streamed data, to the cloud computing system 130. In some examples, the cloud computing system 130 may receive a request from the client computing system 104 or the user computing system 106 to validate a transformation of the first application to the second application, or data thereof, in a cloud computing environment such as the interactive computing environment 107.

Each client computing system 104 may include one or more devices such as individual servers or groups of servers operating in a distributed manner. A client computing system 104 can include any computing device or group of computing devices operated by a service provider or other suitable entity that can provide services via the interactive computing environment 107. In some examples, the services can include generating outputs using an application, such as the first application, the second application, or a combination thereof, in the interactive computing environment 107. The client computing system 104 can include one or more server devices. The one or more server devices can include or can otherwise access one or more non-transitory computer-readable media.

The client computing system 104 can further include one or more processing devices that can be capable of providing the interactive computing environment 107, such as a user interface, a cloud computing environment, etc., that can perform various operations. The interactive computing environment 107 can include executable instructions, such as the first application, the second application, or any combination thereof, stored in one or more non-transitory computer-readable media. The instructions providing the interactive computing environment can configure one or more processing devices to perform the various operations. In some examples, the executable instructions for the interactive computing environment can include instructions that provide one or more graphical interfaces. The graphical interfaces can be used by a user computing system 106 to access various functions or outputs of the interactive computing environment 107. For instance, the interactive computing environment 107 may transmit data to and receive data, such as via the graphical interface, from a user computing system 106 to shift between different states of the interactive computing environment 107, where the different states enable one or more electronic interactions between the user computing system 106 and the client computing system 104 to be performed.

In some examples, the client computing system 104 may include other computing resources associated therewith, such as server computers hosting and managing virtual machine instances for providing cloud computing services, server computers hosting and managing online storage resources for users, server computers for providing database services, and others. The interaction between the user computing system 106, the client computing system 104, and the cloud computing system 130, or any suitable sub-combination thereof may be performed through graphical user interfaces, such as the user interface, presented by the cloud computing system 130, the client computing system 104, other suitable computing systems of the computing environment 100, or any suitable combination thereof. The graphical user interfaces can be presented to the user computing system 106. Application programming interface (API) calls, web service calls, or other suitable techniques can be used to facilitate interaction between any suitable combination or sub-combination of the client computing system 104, the user computing system 106, and the cloud computing system 130.

A user computing system 106 can include any computing device or other communication device that can be operated by a user or entity such as the user that transmits the input file. In some examples, the user or entity may be or include a consumer or a customer. The user computing system 106 can include one or more computing devices such as laptops, smartphones, and other personal computing devices. A user computing system 106 can include executable instructions stored in one or more non-transitory computer-readable media. The user computing system 106 can additionally or alternatively include one or more processing devices configured to execute program code to perform various operations. In various examples, the user computing system 106 can allow a user to access certain online services or other suitable products, services, or computing resources from a client computing system 104, to engage in mobile interactions with the client computing system 104, to obtain controlled access to electronic content, such as the interactive computing environment 107 or infrastructure generated or configured thereon, hosted by the client computing system 104, etc.

In some examples, a user can use the user computing system 106 to engage in an electronic interaction with the client computing system 104 via the interactive computing environment 107. In additional examples, the user can use the user computing system 106 to submit, for example via the interactive computing environment 107 or via other suitable interactive computing environments, a request for infrastructure that can include computing resources, a request for output from an application, etc. The cloud computing system 130 can receive a request, for example from the client computing system 104, to generate or configure infrastructure or computing resources, to generate output from an application, to generate a responsive message to facilitate access control of the user to the generated or configured infrastructure or output from an application, etc.

In some examples, an interactive computing environment 107 implemented through the client computing system 104 can be used to provide access to various online functions. As a simplified example, a user interface or other interactive computing environment 107 provided by the client computing system 104 can include electronic functions for requesting computing resources, output from an application being transformed in a cloud computing environment, online storage resources, network resources, database resources, real-world items or goods, or other types of resources.

A user computing system 106 can be used to request access to the interactive computing environment 107 provided by the client computing system 104, to submit an interaction dispute via the interactive computing environment 107 or other suitable computing environments, or the like. The client computing system 104 can submit a request, such as in response to a request for output from an application, made by the user computing system 106, for infrastructure generation or other output to the cloud computing system 130 and can selectively grant or deny access to the infrastructure or the interactive computing environment 107.

In a simplified example, the system illustrated in FIG. 1 can configure the application transformer 118 to be used for comparing or otherwise analyzing a first application and a second application, or data thereof, or other suitable operations. The application transformer 118 can receive an input file via a user interface provided to the user computing system 106, provided by the client computing system 104 or received via other suitable computing systems. The input file can be or include data, such as input code or outputs, generated by or otherwise associated with the first application, the second application, or a combination thereof. The application transformer 118 can provide the input file to the comparison algorithm(s) 119, the machine-learning model 120, or a combination thereof that can determine or identify differences between the first application and the second application, that can determine or identify quality metrics based on the differences, etc.

The cloud computing system 130 can provide access control or access permission for the output generated from the application transformer 118. The access permission can include, for example, cryptographic keys used to generate valid access credentials or decryption keys used to decrypt access credentials. The client computing system 104 can also allocate resources to the receiving entity and provide a dedicated web address for the allocated resources to the user computing system 106, for example, by adding the user computing system 106 in the access permission. With the obtained access credentials or the dedicated web address, the user computing system 106 can establish a secure network connection to the interactive computing environment 107 hosted by the client computing system 104 and access the resources via invoking API calls, web service calls, HTTP requests, other suitable mechanisms or techniques, etc.

Each communication within the computing environment 100 may occur over one or more data networks, such as a public data network 108, a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the application transformer 118 and the data repository 123, etc., may be instead implemented in a single device or system. Similarly, and as discussed above, the cloud computing system 130 may be a part of the client computing system 104.

Techniques for Infrastructure Generation Using a Dynamic DAG

FIG. 2 is a flowchart illustrating an example of a process 200 for facilitating operation of an artificial intelligence framework that can be used for transforming cloud computing applications according to certain aspects of the present disclosure. One or more computing devices, such as the cloud computing system 130, may implement operations illustrated in FIG. 2 by executing suitable program code such as the application transformer 118, the comparison algorithm(s) 119, the machine-learning model 120, or other suitable program code. For illustrative purposes, the process 200 is described with reference to certain examples depicted in the figures. Other implementations, however, are possible.

At block 202, the process 200 involves receiving data. The data can include a first subset and a second subset. The first subset can correspond with a first application in a cloud computing environment, and the second subset can correspond with a second application in the cloud computing environment. In some examples, the first application and the second application may be different from one another but may be configured to receive similar outputs, to generate similar outputs, or to perform a combination thereof. For example, the second application can be a new version of the first application, can be a replacement application for the first application, etc. In some examples, the data can be received in response to a request to transform the first application to the second application, to validate a transformation of the first application to the second application, etc.

At block 204, the process 200 involves determining a set of differences between the first subset and the second subset. The set of differences can be determined by comparing the first subset with the second subset, by comparing inputs, processing, and outputs between the first application, or first data thereof, and the second application, or second data thereof. In some examples, the set of differences can be determined using a comparison algorithm, or a comparison module that can be independently operated from other modules described in the process 200. The comparison algorithm can involve a side-by-side comparison to identify differences between a left side (e.g., associated with the first application) of the side-by-side comparison and a right side (e.g., associated with the second application) of the side-by-side comparison. The comparison algorithm can compare first code of the first application with second code of the second application, the comparison algorithm can compare first outputs from the first application with second outputs from the second application, etc. In some examples, an output of the comparison algorithm can include the set of differences, which can list what the differences are between the first application and the second application, where the differences are located, and other high-level information about the differences. For example, determining the set of differences between the first subset and the second subset can involve determining (i) a number of differences between the first application and the second application, (ii) a location in code of the second application of each difference included in the number of differences, (iii) a type of difference for each difference included in the number of differences, or any combination thereof.

At block 206, the process 200 involves generating a set of quality metrics based on the set of differences. In some examples, the set of quality metrics can be generated for a transformation from the first application to the second application in the cloud environment. In some examples, the set of quality metrics can be generated using a quality algorithm or a quality module that can be independently operated from other modules described in the process 200. The quality algorithm can receive input that can include a difference report from the comparison algorithm or the comparison module, and the quality algorithm can generate a quality report based at least in part on the set of differences. For example, the quality algorithm can receive (i) the number of differences, (ii) the location in code of the second application of each difference, (iii) the type of difference for each difference included in the number of differences, or any combination thereof. Additionally, or alternatively, the quality algorithm may be configured or trained to generate a quality report that describes (i) how much different the first application is from the second application, (ii) a likelihood of a failed transformation from the first application to the second application if differences included in the number of differences are not remedied, or a combination thereof.

In some examples, the quality algorithm or the quality module can use various sensors or other features to generate the quality report. For example, the quality algorithm or the quality module can use a field sensor or a file sensor to generate information to include in the quality report. The information can describe (i) how much different the first application, or the first data thereof, is from the second application, or the second data thereof, and (ii) the likelihood of the failed transformation from the first application to the second application if differences included in the number of differences are not remedied. In some examples, the field sensor or the file sensor can be configured to receive (i) the number of differences, (ii) the location in code of the second application of each difference, (iii) the type of difference for each difference included in the number of differences, or a combination thereof, as input for generating the quality report.

At block 208, the process 200 involves generating a trend based on historical data. The trend can be generated by a trend algorithm or a trend module. In some examples, the trend can represent a progression of the transformation from the first application to the second application in the cloud environment. The progression may track or otherwise represent how the second application has performed historically compared with the first application. That is, the progression may show that the second application, or second data thereof, is becoming more similar to the first application, or first data thereof, may show that the second application, or the second data thereof, is becoming less similar to the first application, or the first data thereof, etc. The progression may be presented in a user interface to show a trendline that can represent how close to the first application, or first data thereof, that the second application, or second data thereof, is at any given point in time corresponding with comparisons.

Additionally, or alternatively, the historical data can include a first set of historical first subsets and a second set of historical second subsets. Each historical first subset can include data associated with a historical version of the first application, and each historical second subset can include data associated with a historical version of the second application. In some examples, the first set of historical first subsets can be associated with data from the first application in a set of historical comparisons between historical versions of the first application and historical versions of the second application. The second set of second subsets can be associated with data from the second application in the set of historical comparisons. The trend can describe a change in differences between the first application and the second application during a period of time over which comparisons included in set of historical comparisons were performed. Additionally, or alternatively, the trend algorithm or the trend module can generate a visualization, such as via a plot on a user interface, that tracks and visually presents the progression of the transformation from the first application to the second application in the cloud environment.

At block 210, the process 200 involves determining a set of code in the second application. In some examples, a machine-learning model, an artificial intelligence model or agent, or the like can be used to determine the set of code. Additionally, or alternatively, the set of code can be determined to be a likely cause of the set of differences between the first application and the second application. In some examples, the machine-learning model, the artificial intelligence model or agent, or the like can receive input that includes the set of differences, the quality report, the trend, or any combination thereof and can generate one or more predictions based on the input. The one or more predictions can include predictions of which code in the second application may cause, or may be to blame for, the set of differences between the first application and the second application. The one or more predictions may include, for each prediction, (i) an identification of code of the second application and (ii) a confidence score or other score indicating the likelihood that the identified code may cause, or may be to blame for, the set of differences between the first application and the second application.

At block 212, the process 200 involves generating a command based on the set of code or the one or more predictions associated with the set of code. In some examples, the command may be generated by the machine-learning model, the artificial intelligence model or agent, or the like such as by using the set of code, or the one or more predictions associated with the set of code, as input. The command may be executable in the cloud computing environment. For example, the command may be executed by a cloud computing system to cause the set of code in the second application to be automatically updated to a second set of code. That is, the set of code in the second application can be altered (e.g., to become the second set of code) by executing the command. The second set of code may not cause the set of differences. For example, executing a subsequent comparison between the first application and an updated version of the second application may not identify the set of differences since the set of differences may not appear between the first application and the updated version of the second application.

In some examples, determining the set of code in the second application that is likely to cause the set of differences, or generating the command, can include (i) identifying an error in the set of code in the second application and (ii) generating a correction to the set of code, wherein the correction is configured to remedy the error. In some examples, the correction can be or include the second set of code associated with the command. Additionally, or alternatively, the command may be automatically executed, such as by the cloud computing system, to automatically update the set of code in the second application to the second set of code that causes the set of differences to no longer appear in a comparison between the first subset and the second subset.

Example of an Architecture for Artificial Intelligence Framework

Figure 3:
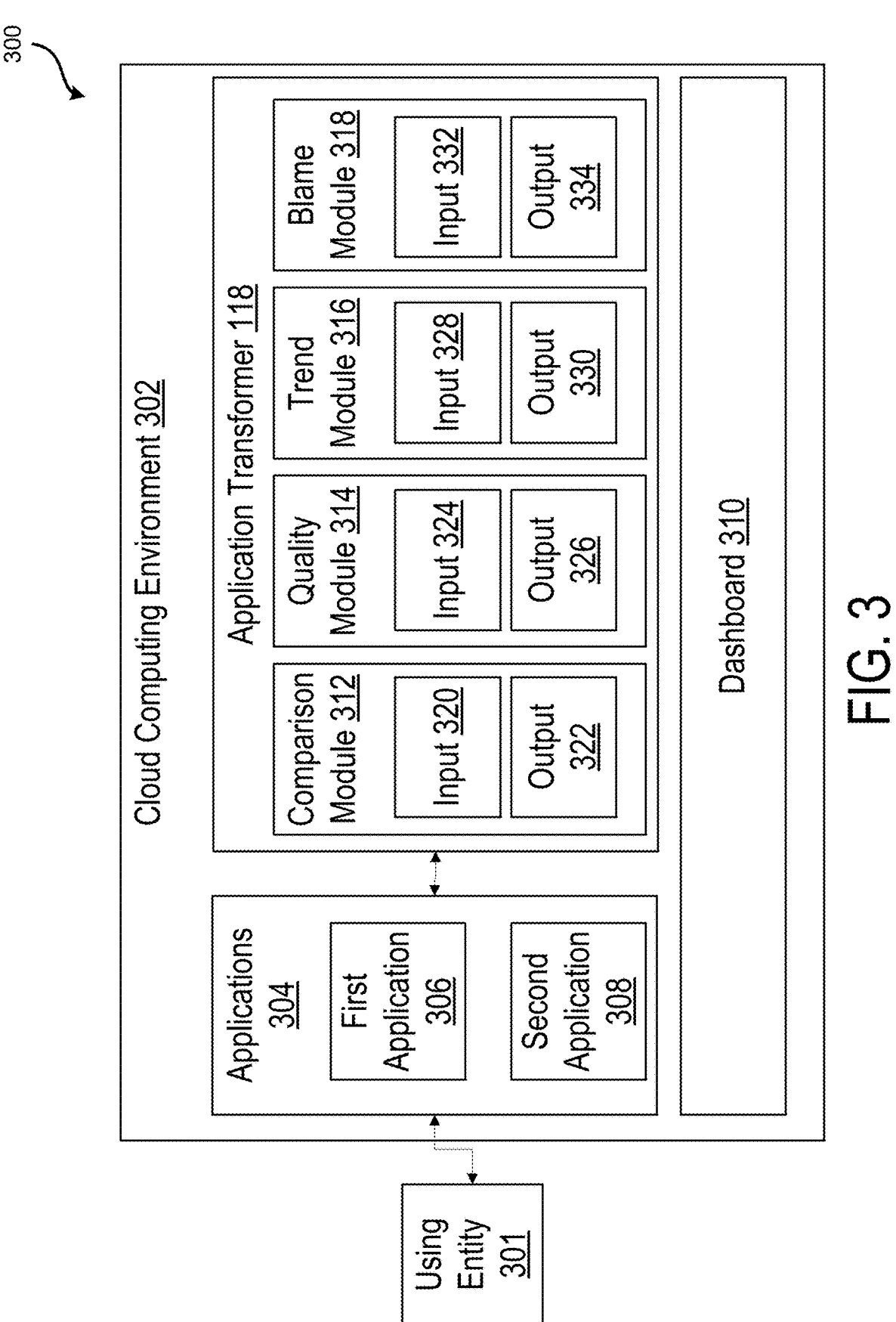
FIG. 3 is an architecture diagram of an artificial intelligence framework that can be used for transforming cloud computing applications according to certain aspects of the present disclosure.

FIG. 3 is an architecture diagram of an artificial intelligence framework 300 that can be used for transforming cloud computing applications according to certain aspects of the present disclosure. As illustrated in FIG. 3, the artificial intelligence framework 300 can include a cloud computing environment 302 which can be in communication with a using entity 301. In some examples, the using entity 301 may transmit data to the cloud computing environment 302, may receive data from the cloud computing environment 302, or a combination thereof. For example, the using entity 301 may transmit input for one or more applications to the cloud computing environment 302, and the one or more applications, such as applications 304, included in the cloud computing environment 302 can generate and transmit output to the using entity 301.

In some examples, the applications 304 can include a first application 306 and a second application 308, though in other examples, the applications 304 can include other suitable numbers, such as less than two or more than two, of applications. Additionally, or alternatively, a transformation between applications included in the applications 304 can be performed and tracked by the artificial intelligence framework 300. For example, the artificial intelligence framework 300 may facilitate a transformation from the first application 306 to the second application 308 in the cloud computing environment 302. In other examples, data generated by the first application 306 may be transformed into data generated by the second application 308 in the cloud computing environment 302.

In some examples, a dashboard 310 can be used to control the transformation, to monitor the transformation, or the like. A request for data can be generated and transmitted, such as by the using entity 301, to the cloud computing environment 302. The applications 304 can receive the request and can generate the data using one or more different code sets, one or more different processes, etc. In examples in which the transformation involves transforming the first application 306 to the second application 308, the second application 308 may generate the data, and the data may be compared with historical data generated by the first application 306. Additionally, or alternatively, the second application 308 may generate the data, and the first application 306 can generate additional data based on the request. The additional data may be compared with the data generated by the second application 308. The dashboard 310 may facilitate the comparison, may track the transformation from the first application 306 to the second application 308, and the like. For example, the dashboard 310 may be used to customize the transformation or the monitoring thereof.

In some examples, the transformation in the cloud computing environment 302 can be performed or otherwise facilitated by the application transformer 118. As illustrated in FIG. 3, the application transformer 118 can include a comparison module 312, a quality module 314, a trend module 316, and a blame module 318. Each of the modules can include their own inputs and outputs for supporting the transformation from the first application 306 to the second application 308 or for supporting monitoring of the transformation. The comparison module 312 can include input 320 and output 322. In some examples, the input 320 can include data about the first application 306, the second application 308, or any data of the combination thereof. The input 320 can be generated in response to receiving the request from the using entity 301. In some examples, the input 320 can include code sets from the first application 306, the second application 308, or a combination thereof. Additionally, or alternatively, the input 320 can include outputs generated by the first application 306, the second application 308, or a combination thereof. The output 322 can be or include a comparison report generated based on the input 320. For example, the output 322 can include an identification of differences between the first application 306 and the second application 308. The differences can include differences between the outputs of the first application 306 and the second application 308, differences in code sets of the first application 306 and the second application 308, etc.

In some examples, the quality module 314 can receive input 324 and can generate output 326. The input 324 can be based on or otherwise include the output 322 generated by the comparison module 312. For example, the input 324 can include identified differences between the first application 306 and the second application 308, or data thereof. In some examples, the quality module 314 can generate the output 326 by generating a quality report based at least in part on the input 324. The quality report can describe how much different the first application 306 is from the second application 308, can describe a likelihood of the transformation from the first application 306 to the second application 308 failing if differences included in the number of differences are not remedied, etc. In some examples, a field sensor, a file sensor, or a combination thereof can be used to generate information for the quality report that describes how much different the first application 306 is from the second application 308, that describes the likelihood of the transformation from the first application 306 to the second application 308 failing if differences included in the number of differences are not remedied, etc. The field sensor, the file sensor, or a combination thereof can be configured to receive (i) the number of differences, (ii) the location in code of the second application 308 of each difference, (iii) the type of difference for each difference included in the number of differences as input, or any combination for generating the quality report.

In some examples, the trend module 316 can receive input 328 and can generate output 330. The input 328 can include historical comparison data involving the first application 306, the second application 308, or a combination thereof. For example, the historical comparison data can include historical first subsets associated with data from the first application 306 in historical comparisons, and the historical comparison data can include second subsets that include data from the second application 308 in the historical comparisons. The output 330 can be or include a trend that can describe a change in differences between the first application 306 and the second application 308 during a period of time over which comparisons included in historical comparisons were performed.

In some examples, the blame module 318 can receive input 332 and can generate output 334. The input 332 can include the output 322 from the comparison module 312, the output 326 from the quality module 314, the output 330 from the trend module 316, or any combination thereof. The output 334 can include an identification of code of the second application 308 that may be responsible for causing differences between the first application 306 and the second application 308, for causing errors in the output generated by the second application 308, etc. In some examples, the blame module 318 can be or include a machine-learning model that can be trained to map code differences, output differences, and the like to code that is likely to cause the identified differences. Additionally, or alternatively, the blame module 318 can automatically generate code replacement or fixes that can be applied to the second application 308 to remedy the identified differences. In some examples, the blame module 318 can automatically apply the code replacement or fixes to the second application 308.

In some examples, the modules of the application transformer 118 may be customizable. For example, the dashboard 310 can be used to alter processing or tasks performed by the comparison module 312, the quality module 314, the trend module 316, the blame module 318, or any combination thereof. Each of the modules may have a default processing path, default code, default machine-learning model, etc., but the dashboard 310 may allow the defaults to be altered or replaced to provide custom processing for the application transformer 118. For example, the default code of the comparison module 312 can be replaced with custom code to cause the comparison module 312 to search for specific types of differences in specific locations. Additionally, or alternatively, the default code of the quality module 314 can be replaced with custom code to cause the quality module 314 to generate specific and custom quality metrics based on identified differences between the first application 306 and the second application 308, and so on.

Example of Computing System

Figure 4:
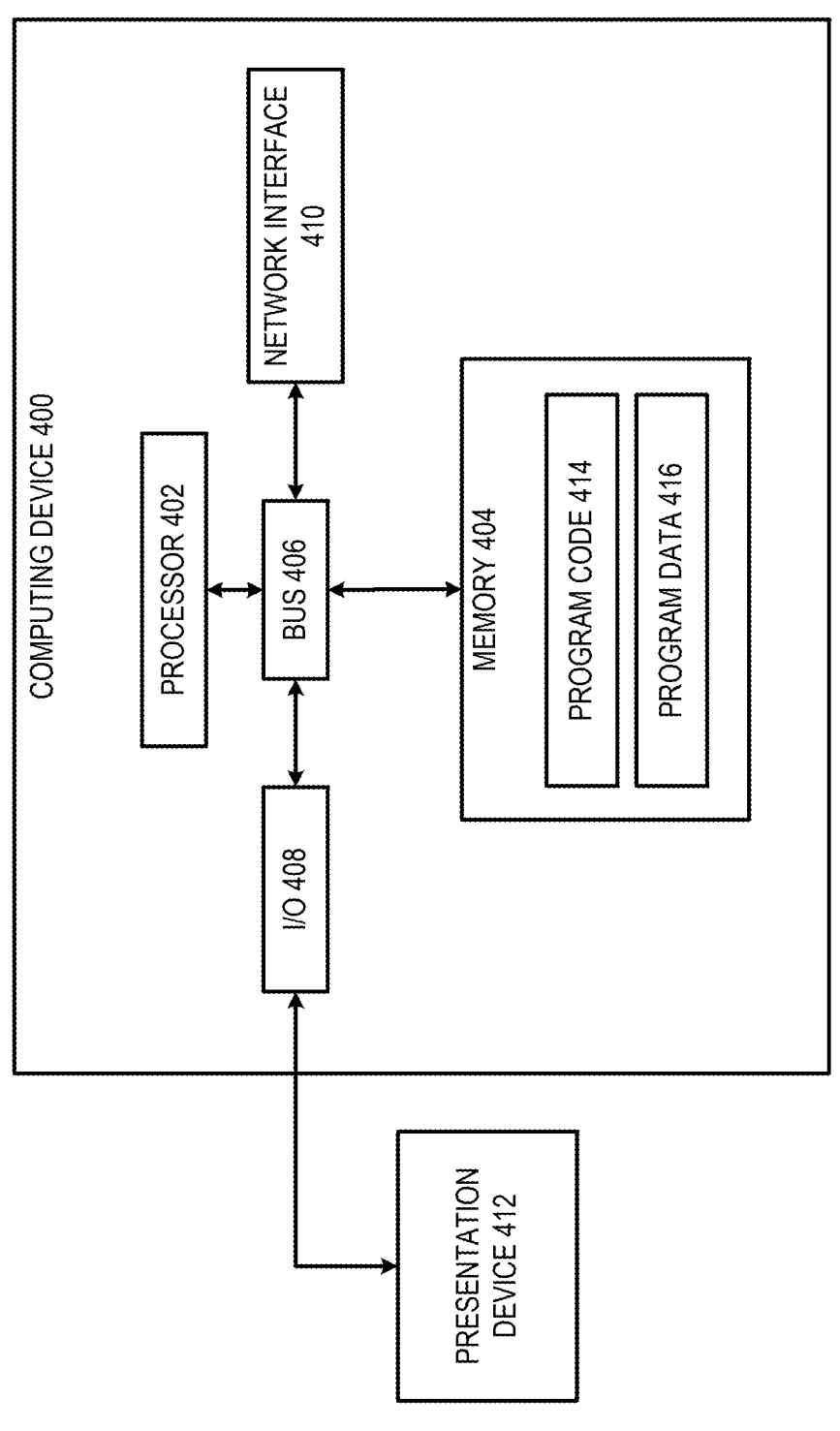
FIG. 4 is a block diagram depicting an example of a computing system suitable for implementing aspects of the techniques and technologies presented herein.

Any suitable computing system or group of computing systems can be used to perform the operations for the artificial intelligence techniques described herein. For example, FIG. 4 is a block diagram illustrating an example of a computing device 400, which can be used to implement the application transformer 118, the comparison algorithm(s) 119, the machine-learning model 120, the cloud computing system 130, or other suitable components of the computing environment 100. The computing device 400 can include various devices for communicating with other devices in the computing environment 100, for example as described with respect to FIG. 1. The computing device 400 can include various devices for performing one or more data consolidation or validation operations, artificial intelligence operations, infrastructure generation or configuration operations, application transformation operations, or other suitable operations, described above with respect to FIGS. 1-3.

The computing device 400 can include a processor 402 that is communicatively coupled with a memory 404. The processor 402 can execute computer-executable program code stored in the memory 404, can access information stored in the memory 404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others.

Examples of a processor 402 can include a microprocessor, an application-specific integrated circuit (ASIC), a field-programmable gate array (FPGA), or any other suitable processing device. The processor 402 can include any suitable number of processing devices, including one. The processor 402 can include or communicate with a memory 404. The memory 404 can store program code that, when executed by the processor 402, causes the processor 402 to perform operations such as one or more of the operations described herein.

The memory 404 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language can include Hadoop, C, C++, C#, Visual Basic, Java, Python, Perl, JavaScript, ActionScript, etc.

The computing device 400 may also include a number of external or internal devices such as input or output devices. For example, the computing device 400 is illustrated with an input/output interface 408 that can receive input from input devices or provide output to output devices. A bus 406 can also be included in the computing device 400. The bus 406 can communicatively couple one or more components of the computing device 400.

The computing device 400 can execute program code 414 that can include the application transformer 118, the algorithms or models thereof, or any other suitable computer model, computer module, computer service, or the like. The program code 414 for the application transformer 118, the algorithms or models thereof, or the like may be resident in any suitable computer-readable medium and may be executed on any suitable processing device. For example, as depicted in FIG. 4, the program code 414 for the application transformer 118, the algorithms or models thereof, etc. can reside in, or may otherwise be included in, the memory 404 at the computing device 400 along with the program data 416 associated with the program code 414. Executing the application transformer 118, the algorithms or models thereof, etc. can configure the processor 402 to perform one or more of the operations described herein.

In some aspects, the computing device 400 can include one or more output devices. One example of an output device can be the network interface device 410 illustrated in FIG. 4. A network interface device 410 can include any device or group of devices suitable for establishing a wired or wireless data connection to one or more data networks described herein. Non-limiting examples of the network interface device 410 can include an Ethernet network adapter, a modem, etc.

Another example of an output device can include the presentation device 412 depicted in FIG. 4. A presentation device 412 can include any device or group of devices suitable for providing visual, auditory, or other suitable sensory output. Non-limiting examples of the presentation device 412 can include a touchscreen, a monitor, a speaker, a separate mobile computing device, etc. In some aspects, the presentation device 412 can include a remote client-computing device that can communicate with the computing device 400 using one or more data networks described herein. In other aspects, the presentation device 412 can be optional.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A system comprising:

a processor; and a non-transitory computer-readable medium comprising instructions that are executable by the processor to cause the processor to perform operations comprising:

receiving data that includes a first subset and a second subset, the first subset comprising data relating to a first application in a cloud computing environment, and the second subset comprising data relating to a second application in the cloud computing environment;

determining a set of differences between the first subset and the second subset by comparing the first subset and the second subset;

generating, using the set of differences as input, a set of quality metrics for a transformation from the first application to the second application in the cloud computing environment;

generating, using a set of historical data that includes a plurality of historical first subsets and a plurality of second subsets, a trend that represents a progression of the transformation from the first application to the second application in the cloud computing environment;

determining, using the set of differences, the set of quality metrics, and the trend, a set of code in the second application that is likely to cause the set of differences; and generating a command that is executable in the cloud computing environment to automatically update the set of code to a second set of code in the second application, wherein the second set of code does not cause the set of differences.

2. The system of claim 1, wherein the operation of determining the set of code in the second application that is likely to cause the set of differences comprises:

identifying, based on a prediction generated by a machine-learning model, an error in the set of code; and generating, based on the prediction generated by the machine-learning model, a correction to the set of code, wherein the correction is configured to remedy the error.

3. The system of claim 1, wherein the operation of determining the set of differences between the first subset and the second subset comprises determining (i) a number of differences between the first application and the second application, (ii) a location in code of the second application of each difference included in the number of differences, and (iii) a type of difference for each difference included in the number of differences.

4. The system of claim 3, wherein the operation of generating the set of quality metrics for the transformation from the first application to the second application in the cloud computing environment comprises:

receiving (i) the number of differences, (ii) the location in code of the second application of each difference included in the number of differences, and (iii) the type of difference for each difference included in the number of differences; and generating a quality report that describes (i) how much different the first application is from the second application and (ii) a likelihood of a failed transformation from the first application to the second application if differences included in the number of differences are not remedied.

5. The system of claim 4, wherein the operation of generating the quality report comprises using a field sensor or a file sensor to generate the quality report, and wherein the field sensor or the file sensor are configured to receive (i) the number of differences, (ii) the location in code of the second application of each difference included in the number of differences, and (iii) the type of difference for each difference included in the number of differences as input for generating the quality report.

6. The system of claim 1, wherein the plurality of historical first subsets is associated with data from the first application in a plurality of historical comparisons, wherein the plurality of second subsets is associated with data from the second application in the plurality of historical comparisons, and wherein the trend describes a change in differences between the first application and the second application during a period of time over which comparisons included in the plurality of historical comparisons were performed.

7. The system of claim 1, wherein the operations further comprise executing the command to automatically update the set of code in the second application to the second set of code that causes the set of differences to no longer appear in a comparison between the first subset and the second subset.

8. A method comprising:

receiving data that includes a first subset and a second subset, the first subset comprising data relating to a first application in a cloud computing environment, and the second subset comprising data relating to a second application in the cloud computing environment;

determining a set of differences between the first subset and the second subset by comparing the first subset and the second subset;

generating, using the set of differences as input, a set of quality metrics for a transformation from the first application to the second application in the cloud computing environment;

generating, using a set of historical data that includes a plurality of historical first subsets and a plurality of second subsets, a trend that represents a progression of the transformation from the first application to the second application in the cloud computing environment;

determining, using the set of differences, the set of quality metrics, and the trend, a set of code in the second application that is likely to cause the set of differences; and generating a command that is executable in the cloud computing environment to automatically update the set of code to a second set of code in the second application, wherein the second set of code does not cause the set of differences.

9. The method of claim 8, wherein the determining the set of code in the second application that is likely to cause the set of differences comprises:

identifying, based on a prediction generated by a machine-learning model, an error in the set of code; and generating, based on the prediction generated by the machine-learning model, a correction to the set of code, wherein the correction is configured to remedy the error.

10. The method of claim 8, wherein the determining the set of differences between the first subset and the second subset comprises determining (i) a number of differences between the first application and the second application, (ii) a location in code of the second application of each difference included in the number of differences, and (iii) a type of difference for each difference included in the number of differences.

11. The method of claim 10, wherein the generating the set of quality metrics for the transformation from the first application to the second application in the cloud computing environment comprises:

receiving (i) the number of differences, (ii) the location in code of the second application of each difference included in the number of differences, and (iii) the type of difference for each difference included in the number of differences; and generating a quality report that describes (i) how much different the first application is from the second application and (ii) a likelihood of a failed transformation from the first application to the second application if differences included in the number of differences are not remedied.

12. The method of claim 11, wherein the generating the quality report comprises using a field sensor or a file sensor to generate the quality report, and wherein the field sensor or the file sensor are configured to receive (i) the number of differences, (ii) the location in code of the second application of each difference included in the number of differences, and (iii) the type of difference for each difference included in the number of differences as input for generating the quality report.

13. The method of claim 8, wherein the plurality of historical first subsets is associated with data from the first application in a plurality of historical comparisons, wherein the plurality of second subsets is associated with data from the second application in the plurality of historical comparisons, and wherein the trend describes a change in differences between the first application and the second application during a period of time over which comparisons included in the plurality of historical comparisons were performed.

14. The method of claim 8, further comprising executing the command to automatically update the set of code in the second application to the second set of code that causes the set of differences to no longer appear in a comparison between the first subset and the second subset.

15. A non-transitory computer-readable medium comprising instructions that are executable by a processing device for causing the processing device to perform operations comprising:

receiving data that includes a first subset and a second subset, the first subset comprising data relating to a first application in a cloud computing environment, and the second subset comprising data relating to a second application in the cloud computing environment;

determining a set of differences between the first subset and the second subset by comparing the first subset and the second subset;

generating, using the set of differences as input, a set of quality metrics for a transformation from the first application to the second application in the cloud computing environment;

generating, using a set of historical data that includes a plurality of historical first subsets and a plurality of second subsets, a trend that represents a progression of the transformation from the first application to the second application in the cloud computing environment;

determining, using the set of differences, the set of quality metrics, and the trend, a set of code in the second application that is likely to cause the set of differences; and generating a command that is executable in the cloud computing environment to automatically update the set of code to a second set of code in the second application, wherein the second set of code does not cause the set of differences.

16. The non-transitory computer-readable medium of claim 15, wherein the operation of determining the set of code in the second application that is likely to cause the set of differences comprises:

identifying, based on a prediction generated by a machine-learning model, an error in the set of code; and generating, based on the prediction generated by the machine-learning model, a correction to the set of code, wherein the correction is configured to remedy the error.

17. The non-transitory computer-readable medium of claim 15, wherein the operation of determining the set of differences between the first subset and the second subset comprises determining (i) a number of differences between the first application and the second application, (ii) a location in code of the second application of each difference included in the number of differences, and (iii) a type of difference for each difference included in the number of differences.

18. The non-transitory computer-readable medium of claim 17, wherein the operation of generating the set of quality metrics for the transformation from the first application to the second application in the cloud computing environment comprises:

receiving (i) the number of differences, (ii) the location in code of the second application of each difference included in the number of differences, and (iii) the type of difference for each difference included in the number of differences; and generating a quality report that describes (i) how much different the first application is from the second application and (ii) a likelihood of a failed transformation from the first application to the second application if differences included in the number of differences are not remedied.

19. The non-transitory computer-readable medium of claim 18, wherein the operation of generating the quality report comprises using a field sensor or a file sensor to generate the quality report, and wherein the field sensor or the file sensor are configured to receive (i) the number of differences, (ii) the location in code of the second application of each difference included in the number of differences, and (iii) the type of difference for each difference included in the number of differences as input for generating the quality report.

20. The non-transitory computer-readable medium of claim 15, wherein the plurality of historical first subsets is associated with data from the first application in a plurality of historical comparisons, wherein the plurality of second subsets is associated with data from the second application in the plurality of historical comparisons, and wherein the trend describes a change in differences between the first application and the second application during a period of time over which comparisons included in the plurality of historical comparisons were performed.

\*     \*     \*     \*     \*